United States Patent
Valentin et al.

(10) Patent No.: US 6,943,823 B2
(45) Date of Patent: Sep. 13, 2005

(54) METHOD AND DEVICE FOR PRODUCING HEIGHT IMAGES OF TECHNICAL SURFACES WITH MICROSCOPIC RESOLUTION

(75) Inventors: Jürgen Valentin, Duisburg (DE); Joachim Jordan, Nettetal-Kaldenkirchen (DE); Hans-Hermann Schreier, Oldenburg (DE)

(73) Assignee: NanoFocus AG, Oberhausen-Rhld. (DE)

( * ) Notice: Subject to any disclaimer, the term of this patent is extended or adjusted under 35 U.S.C. 154(b) by 618 days.

(21) Appl. No.: 09/958,523

(22) PCT Filed: Jan. 11, 2001

(86) PCT No.: PCT/DE01/00086
§ 371 (c)(1),
(2), (4) Date: Jan. 11, 2002

(87) PCT Pub. No.: WO01/59443
PCT Pub. Date: Aug. 16, 2001

(65) Prior Publication Data
US 2002/0167659 A1 Nov. 14, 2002

(30) Foreign Application Priority Data
Feb. 10, 2000 (DE) .................................. 100 05 852

(51) Int. Cl.[7] ................................................ H04N 7/18
(52) U.S. Cl. ...................... 348/87; 382/145; 359/368
(58) Field of Search ............................. 348/87; 382/145, 382/147; 250/201.3, 559.22; 359/368; 356/625

(56) References Cited

U.S. PATENT DOCUMENTS

| | | | |
|---|---|---|---|
| 4,748,335 A | * 5/1988 | Lindow et al. | 250/559.22 |
| 5,084,712 A | 1/1992 | Hock et al. | |
| 5,594,235 A | * 1/1997 | Lee | 250/201.3 |
| 6,111,690 A | * 8/2000 | Tanaami | 359/368 |
| 6,249,347 B1 | * 6/2001 | Svetkoff et al. | 356/625 |
| 6,388,808 B1 | * 5/2002 | Tanaami | 359/368 |

OTHER PUBLICATIONS

Hans J. Tiziani and Hans–Martin Uhde (1994) "Three–Dimensional Analysis by a Microlens–Array Confocal Arrangement", Applied Optics, vol. 33, No. 4, pp. 567–572, (enclosed).

* cited by examiner

Primary Examiner—Gims Philippe
(74) Attorney, Agent, or Firm—Collard & Roe, P.C.

(57) ABSTRACT

A method for producing height images of technical surfaces with microscopic resolution uses a confocal measuring microspace. The sample to be measured is displaced in the direction (Z direction) towards the microspace in a controlled manner and images are produced at defined distances with a digital camera. The digitized images recorded are transmitted to a controller (PC) for further processing and evaluation and the light intensity maximum for every pixel is detected, the position of the maximum indicating the height of the sample to be measured. The sample is displaced in a continuous manner and that the image exposures are triggered at discrete localized distances. The intensities of the N individual images recorded and digitized in the above manner are stored in the PC in such a manner that a number N of subsequent storage locations is occupied for every pixel.

21 Claims, 2 Drawing Sheets

METHOD AND DEVICE FOR PRODUCING HEIGHT IMAGES OF TECHNICAL SURFACES WITH MICROSCOPIC RESOLUTION

CROSS REFERENCE TO RELATED APPLICATIONS

Applicants claim priority under 35 U.S.C. §119 of German Application No. 100 05 852.3, filed on Feb. 10, 2000. Applicants also claim priority under 35 U.S.C. 365 of PCT/DE01/00086, filed on Jan. 11, 2001. The international application under PCT article 21 (2) was not published in English.

BACKGROUND OF THE INVENTION

1. Field of the Invention

The invention relates to a method and a device for producing height images of technical surfaces with microscopic resolution with the help of a confocal measuring microscope, whereby the sample to be measured is displaced in a controlled manner in the direction (Z-direction) of the microscope and images are produced at defined distances by means of a digital camera, and the recorded digitized images are transmitted to a controller (PC) for further processing and evaluation, in a manner such that the light intensity maximum is detected for each pixel and the position of the maximum indicates the height of the sample to be measured.

Furthermore, the invention relates to a device for carrying out the method.

2. The Prior Art

Confocal measuring microscopes are employed for inspecting technical surfaces, whereby both the microscopic image (light intensity) of the surface of the sample and the local height associated with the surface are measured. The application relates in this connection to all areas of microstructure technology; however, without being limited thereto.

The measuring system is comprised of the actual confocal measuring branch; a camera; a unit digitizing the image; a controller (generally a PC); a motor-driven displacement unit for through-focusing the surface of the sample (movement of displacement in the Z-direction); as well as a control for jointly controlling the motor-driven displacement unit (see FIG. 2).

The mode of operation of the known measuring microscope consists in that the sample located under the lens of the microscope is vertically displaced step by step vis-à-vis the microscope (or the microscope is displaced in the direction of the sample).

This means that an image is recorded, for example by means of a CCD-camera each time the sample has been displaced by a defined distance and stopped in that position. Following the recording and digitization, the recorded image is analyzed (in the PC).

As a rule, the light intensity of an individual pixel shows in this connection a Gaussian distribution as the function of the displacement, whereby the position of the maximum indicates the height of the sample to be measured. Since the maximum cannot be measured directly in practical applications, the curve is scanned step by step for determining the maximum.

The evaluation is carried out in this connection in an accumulative manner. The sum of the intensity "I" as well as the sum of the intensity multiplied by the adjusted displacement "z" are added up in this connection in two separate memories.

After a full run-through has been completed (recording of an N number of images), the point of concentration "zs" is calculated with respect to the displacement according to the formula $$zs = \frac{\sum I \cdot z}{\sum I}.$$

Said point of concentration approximately coincides with the maximum. In order to increase the accuracy, only those intensities that are above a threshold to be adjusted are included in the calculation, as a rule. Said threshold has to be determined locally (i.e. pixel by pixel)), for example as the mean intensity. An additional run-through is then required for the determination of said threshold, which takes place prior to the actual measuring run-through.

However, said known method is afflicted with various drawbacks.

The low dynamics of a CCD-camera leads to the fact that local areas reflecting to highly varying degrees cannot be detected simultaneously.

The method is rather time-consuming because of the additional run-through needed for the determination of the threshold (see above).

Furthermore, the time expenditure is increased by the step-by-step adjustment of the displacement. Moreover, this may cause shocks notably as the mechanical system is being accelerated and slowed down.

Another drawback arises from the accumulative evaluation addressed above. The evaluation according to the formula specified above requires a symmetrical distribution of the intensity. However, slightly asymmetrical curves are found in practical application. The evaluation according to the above formula fails when several maximums appear, or it supplies erroneous values. An additional maximum (secondary peg), however, may appear in connection with semi-transparent layers.

The possibility of detecting evaluation errors and the determination of the quality of the measurement are generally inadequate, to begin with.

An additional drawback has to be seen in that the displacement unit has to be controlled by the controller because no direct coupling is available between the displacement unit and the unit digitizing the image.

Therefore, the invention is based on the object of controlling a method of the type specified above in such a manner that an enhanced evaluation of the recorded images allowing a distinction between secondary maximums and artifacts is made possible in conjunction with a significant reduction of the time expenditure.

It is a further object of the invention to propose a device for carrying out the method.

The first part of the solution is solved according to the characterizing part of claim 21 in that the displacement movement of the sample takes place continuously and the image exposures are triggered at discrete localized distances as the sample is being displaced, and in that the intensities of the N number of individual images so recorded and digitized are stored in the PC in such a manner that a number N of subsequent storage locations is occupied for every pixel, such storage locations being successively filled from the first to the Nth image, whereupon the respective intensity maximum/intensity maximums is/are calculated and is/are evaluated on the basis of all measured data.

Owing to the fact that the sample is displaced in a continuous movement, a completely jerk-free location-dependent image recording is obtained in addition to the advantage gained in terms of time. The individual images are stored in this connection in a form meeting the evaluation requirements. This means that with a total number of N images, whose digitization is triggered in the course of the measurement, a number N of successive storage locations are occupied for every pixel. Said storage locations are now successively filled from the first to the last image. The advantage of this is that the intensities of a pixel required for the later calculation are arranged in the technically useful sequence. The sequence permitting quick access to the measured data is defined as being the technically useful sequence.

An evaluation including all measured data is carried out instead of an accumulative evaluation. In the evaluation, a search is carried out for all occurring maximums. Criteria for detecting a maximum (e.g. the threshold value) can be preset in this connection in a variable manner. The search for maximums preferably takes place in this connection according to the three search methods that can be preset selectively:

(1) Only the lowest maximum (lowest layer) is evaluated.
(2) Only the uppermost (top layer) is evaluated.
(3) Both maximums are evaluated.

In case only one maximum is present (i.e. if the model is not a semi-transparent one), the methods coincide.

With the help of the determination of the position of two maximums (if such maximums are present, for example in connection with semi-transparent models), their distance from each other is used for calculating the layer thickness of the assumed layer. The functionality of the measuring microscope is basically expanded in this manner.

According to claim 22, position-transmitting trigger pulses are tapped by the element displaced in the Z-direction and supporting the sample for the location-dependent triggering of the image exposure.

According to claim 23, the localized distance effecting the triggering of an image exposure is adjusted in this connection in a defined manner, whereby a variable division of the incremental basic signal generated by the location detection system is carried out by means of the programming of a microprocessor.

According to claim 22, position-transmitting trigger pulses are tapped by the element displaced in the Z-direction and supporting the sample for the location-dependent triggering of the image exposure.

According to claim 23, the localized distance effecting the triggering of an image exposure is adjusted in this connection in a defined manner, whereby a variable division of the incremental basic signal generated by the location detection system is carried out by means of the programming of a microprocessor.

As just addressed above, the image exposure is triggered at discrete localized distances by a location detection system mounted on the displacement unit. Said location detecting system may be, for example an incremental decoder mounted on the axle of the motor employed for the displacement, or an optoelectronic distance scale mounted on the displacement table. If a voltage-controlled piezo-adjuster is employed for the displacement, this may be a DMS distance recorder.

By means of synchronization or coupling with the measuring process, it is possible that the displacement is controlled by an external control. Thus the device as defined by the indention can be tied into an external process, preferably in the form of a process measuring device incorporated in the manufacture of micro-structures.

The intensities of the individual images recorded as described above are stored in a complete manner. They are preferably stored on a fixed storage medium (e.g. on a fixed disk) or in the operating memory of the system controller.

Preferably an approximation by way of calculation with a mathematically describable form of the curve is carried out for determining the position of the respective maximum. Such a form of the curve is entered preferably as a Gaussian curve, but may also have the form of a parabola.

In addition to the position of the maximums, the forms of their curves are described with the help of scalar quantities as well. The form of the curve with approximation of a Gaussian curve is preferably described with the help of the half-value width and quality.

With the help of the determination of the form of the curve it is then possible to derive criteria permitting the exclusion of measured values (for example of artifacts).

As the total number of all measured values is available, noise-suppressing methods are employed in the pre-processing stage. This means that a digital signal filtration (rectangular or Gauss filter) is employed.

The entire surface of the sample is inspected in this way, in a manner such that after an area of the sample has been measured, the sample is displaced in a plane (X/Y) perpendicular to the optical axis of the measuring microscope, so that an adjacent area of the sample can be measured, and an assembled image of the surface structure of the sample is immediately obtained by electronic stitching of the measured results of each of the neighboring areas.

A CMOS-sensor is preferably used for the recording irrespective of the measuring method; however, a CCD-sensor can be employed as well.

BRIEF DESCRIPTION OF THE DRAWING

The structure of the device as defined by the present invention is now briefly explained in the following with the help of drawings, in which.

DETAILED DESCRIPTION OF PREFERRED EMBODIMENTS

Figure 1:
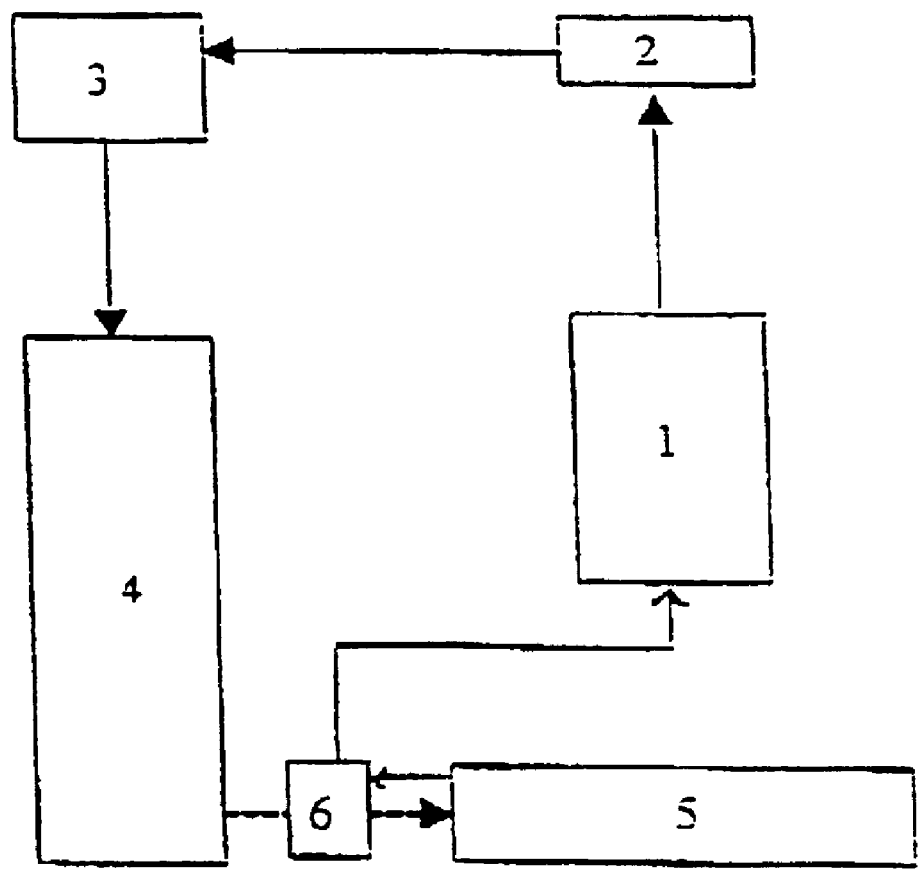
FIG. 1 is the circuit diagram of the confocal measuring microscope (according to the invention)

In both figures, identical elements are denoted by the same reference numerals. Both circuit diagrams have in common the confocal optical microscope branch denoted by the reference numeral 1, whose images are recorded by a digital camera 2, by which the images are then transmitted in the digitized form to a system controller 4 via a digitizing unit 3. The recorded images are then evaluated in said system controller. The sample to be measured is located on a motor-driven displacement unit 5 for through-focusing the surface of the sample. The displacement movement in the direction of the microscope 1 is effected by the controller 4 via the control 6 (FIG. 2).

Figure 2:
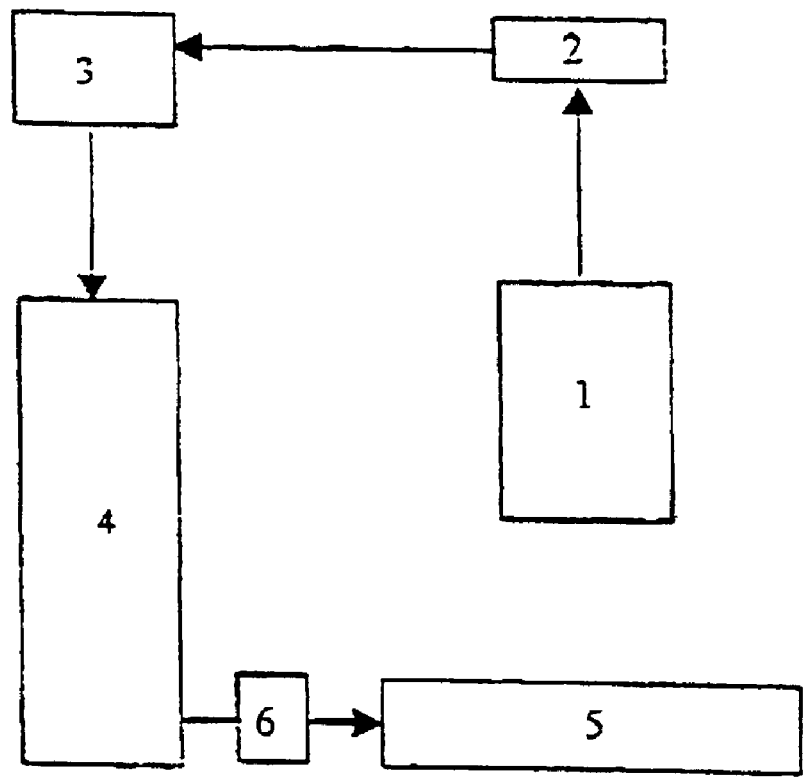
FIG. 2 is the circuit diagram of a confocal measuring microscope according to the prior art.

The device according to FIG. 2, that is to say the device as defined by the invention, is different in that a location detection system is arranged on the displacement unit 5. Such location detection system may be, for example an incremental decoder mounted on the axis of the motor employed for the displacement, or an optoelectronic distance scale mounted on the displacement table. The control via the system controller 4 can be omitted in this way and the displacement movement can be controlled externally. The location detection system on the displacement unit 5 supplies the camera/microscope unit with the trigger signals required for triggering the image exposures.

What is claimed:

1. A method for producing height images of technical surfaces with microscopic resolution with the help of a confocal measuring microscope, whereby the sample to be measured is displaced in a controlled manner in the direction (Z-direction) of the microscope and the recorded digitized images are transmitted to a controller (PC) for further processing an evaluation, in a manner such that the light intensity maximum is determined for every pixel, whereby the position of the maximum supplies the height of the sample to be measured;

wherein the sample is displaced continuously and the image exposures are triggered in the course of displacement at discrete localized distances; and that the intensities of the N number of individual images so recorded and digitized are stored in the PC, in such a manner that a number N of successive storage locations are occupied for every pixel, such storage locations being successively filled from the first to the Nth image, whereupon the respective intensity maximum/the respective intensity maximums is/are determined by calculation for every pixel and evaluated on the basis of all measured data; and wherein for the location-dependent triggering of the image exposure, trigger pulses transmitting the position are tapped from the element displaced in the Z-direction and supporting the sample.

2. The method according to claim 1,
wherein the localized distance effecting the triggering of an image exposure is adjusted in a defined manner, whereby a variable division of the incremental basic signal generated by the localized detection is carried out by means of the programming of a microprocessor.

3. The method according to claim 1,
wherein the displacement movement can be controlled externally.

4. The method according to claim 1,
wherein the intensities are stored on a fixed storage medium.

5. The method according to claim 4,
wherein the storage takes place on a fixed disk.

6. The method according to claim 3,
wherein the storage takes place in the operating memory of the controller.

7. The method according to claim 1,
wherein for the determination of the position of the maximum/maximums, an approximation is carried out by calculation with a form of the curve that can be described mathematically.

8. The method according to claim 7,
wherein the form of the curve is entered as a Gaussian curve.

9. The method according to claim 7,
wherein the form of the curve is entered as a parabola.

10. The method according to claim 7,
wherein the form of the curve is described with the help of scalar quantities (half-value width, quality, etc.).

11. The method according to claim 1,
wherein the noise is suppressed in the form of digital signal filtration in a step preprocessing the measured data.

12. The method according to claim 1,
wherein in connection with semi-transparent layers to be measured, the lowest maximum (lowest layer) and/or the uppermost maximum (top layer) are evaluated.

13. The method according to claim 1,
wherein after measuring an area of the sample, the sample is displaced in a plane (X/Y) perpendicular to the optical axis of the measuring microscope, so that an adjacent area of the sample can be measured and an assembled image of the surface structure of the sample is immediately obtained by electronic stitching of the results measured for each of the areas neighboring on one another.

14. A device for carrying out the method according to claim 1, comprising
a confocal measuring microscope; a sample table arranged underneath the microscope and displaceable in the X-Y-Z directions; a process control; and
a digital camera connected to a unit digitizing the images, said unit in turn being connected to a system controller (PC),
wherein provision is made on the displaceable sample table (5) for a position transmitter whose signal output is connected to the measuring microscope (1) and/or the digital camera (2) via the process control (6).

15. The device according to claim 14,
wherein the position transmitter is an incremental decoder mounted on the axle of the motor mounted on the sample table (5) and used for the displacement.

16. The device according to claim 14,
wherein the position transmitter is an optoelectronic distance scale on the sample table (5).

17. The device according to claim 14,
wherein the position transmitter is a voltage-controlled piezo-adjuster (for example a DMS-distance recorder).

18. The device according to claim 14,
wherein the digital camera (2) is equipped with a CMOS-sensor.

19. The device according to claim 14,
wherein the digital camera (2) is equipped with a CCD-sensor.

20. A method for producing height images of technical surfaces with microscopic resolution with the help of a confocal measuring microscope, whereby the sample to be measured is displaced relatively to the microscope in a controlled manner in the direction (Z-direction) of the microscope and the recorded digitized images are transmitted to a controller (PC) for further processing an evaluation, in a manner such that the light intensity maximum is determined for every pixel, whereby the position of the maximum supplies the height of the sample to be measured;

wherein the sample is displaced continuously and the image exposures are triggered in the course of displacement at discrete localized distances; and that the intensities of the N number of individual images so recorded and digitized are stored in the PC, in such a manner that a number N of successive storage locations are occupied for every pixel, such storage locations being successively filled from the first to the Nth image, whereupon the respective intensity maximum/the respective intensity maximums is/are determined by calculation for every pixel and evaluated on the basis of all measured data, wherein for the location-dependent triggering of the image exposure, trigger pulses transmitting the position are tapped from the element displaced in the Z-direction and supporting the sample.

21. A device for carrying out the method according to claim 20, comprising a confocal measuring microscope; a sample table arranged underneath the microscope and displaceable in the X-Y-Z-directions; a process control; and a digital camera connected to a unit digitizing the images, said unit in turn being connected to a system controller (PC), wherein provision is made on the displaceable sample table (5) for a position transmitter whose signal is connected to the measuring microscope (1) and/or the digital camera (2) via the process control (6).

* * * * *